United States Patent
Sun et al.

(10) Patent No.: US 8,144,421 B2
(45) Date of Patent: Mar. 27, 2012

(54) RADIAL POSITION SEEK TUNING FOR ACOUSTIC PERFORMANCE

(75) Inventors: Yu Sun, Fremont, CA (US); Yanning Liu, San Ramon, CA (US)

(73) Assignee: Seagate Technology LLC, Cupertino, CA (US)

( * ) Notice: Subject to any disclaimer, the term of this patent is extended or adjusted under 35 U.S.C. 154(b) by 585 days.

(21) Appl. No.: 11/713,531

(22) Filed: Mar. 1, 2007

(65) Prior Publication Data

US 2007/0206317 A1 Sep. 6, 2007

Related U.S. Application Data

(60) Provisional application No. 60/778,240, filed on Mar. 1, 2006.

(51) Int. Cl.
*G11B 5/55* (2006.01)
(52) U.S. Cl. .................................. 360/78.09; 360/78.04
(58) Field of Classification Search ........................ None
See application file for complete search history.

(56) References Cited

U.S. PATENT DOCUMENTS

| | | | | |
|---|---|---|---|---|
| 5,901,009 A * | 5/1999 | Sri-Jayantha et al. | ..... | 360/78.04 |
| 6,005,742 A * | 12/1999 | Cunningham et al. | ..... | 360/78.05 |
| 6,597,528 B1 * | 7/2003 | Pang et al. | ................. | 360/78.04 |
| 6,624,964 B1 * | 9/2003 | Pirzadeh | ..................... | 360/78.07 |
| 6,690,534 B2 * | 2/2004 | Ding et al. | ................. | 360/78.06 |
| 6,754,036 B2 * | 6/2004 | Dehnert | ..................... | 360/78.07 |
| 6,757,622 B2 * | 6/2004 | Fioravanti | ....................... | 702/39 |
| 6,762,571 B2 * | 7/2004 | Min et al. | .................. | 360/78.04 |
| 6,937,428 B2 * | 8/2005 | Ho et al. | .................... | 360/78.06 |
| 7,088,538 B1 * | 8/2006 | Codilian et al. | ................ | 360/69 |
| 7,206,162 B2 * | 4/2007 | Semba et al. | .............. | 360/78.04 |
| 7,248,428 B2 * | 7/2007 | Kim et al. | .................. | 360/78.06 |
| 7,253,989 B1 * | 8/2007 | Lau et al. | .................... | 360/78.04 |
| 7,271,976 B2 * | 9/2007 | Ishii et al. | ........................ | 360/75 |
| 7,342,739 B2 * | 3/2008 | Park et al. | .................. | 360/78.04 |
| 7,489,471 B2 * | 2/2009 | Stoev et al. | ................. | 360/78.04 |
| 2007/0064337 A1 * | 3/2007 | Aoki et al. | .................. | 360/78.04 |
| 2007/0156396 A1 * | 7/2007 | Ehrlich | .......................... | 704/216 |

* cited by examiner

*Primary Examiner* — K. Wong
*Assistant Examiner* — James L Habermehl
(74) *Attorney, Agent, or Firm* — David K. Lucente

(57) ABSTRACT

Examples of the present invention relate to reduction in acoustic noise by tuning seek characteristics of a servo controller, depending on a radial position of a head relative to a disk. The servo controller can provide compensation for acoustic resonance modes.

25 Claims, 4 Drawing Sheets

RADIAL POSITION SEEK TUNING FOR ACOUSTIC PERFORMANCE

CROSS-REFERENCE TO RELATED PATENT APPLICATIONS

Embodiments of the present invention relate to U.S. Provisional Application Ser. No. 60/778,240, filed Mar. 1, 2006, entitled "Variable Position Mode Seek Table to Minimize Excitation to High-Frequency Resonance Across Stroke", the contents of which are incorporated by reference herein and which is a basis for a claim of priority.

BACKGROUND

Embodiments of the present invention relate generally to servo control systems, and more particularly servo control system with compensation for acoustic resonance modes.

Disk drives are widely used in computers and other electronic devices for the storage and retrieval of data. In the past, there has been a focus on improving disk drive performance by minimizing seek time during reads and writes. As a result, seek operations have traditionally been performed as quickly as possible. In order to maximize disk drive performance, disk drive manufacturers have generally sought to minimize seek time by employing a seek profile known as a performance seek profile or a bang-bang seek profile. Such a performance seek profile typically involves a head subjected to instantaneous maximum acceleration until the head reaches a maximum velocity, which is held until the head is subjected to maximum deceleration.

Such a performance seek profile has come to be known as a bang-bang seek profile, because the actuator first moves the head with maximum acceleration, and then later moves the head with maximum deceleration. By controlling the actuator to move the head with maximum acceleration and deceleration, noticeable levels of acoustic noise are generated due to vibration introduced to an actuator arm assembly on which the head is mounted as a result of the instantaneous acceleration and deceleration by the actuator.

More recently, there has been a recognition that when the mechanical components of a disk drive are moved as quickly as possible to minimize seek time, acoustic noise is generated that can be annoying and even worrisome to end users. Some levels of noise have become problematic, particularly in applications such as digital video recorders (DVRs), which are often used in an occupied, quiet room in which disk drive noises are unexpected, such as a living room or bedroom, leading to end user dissatisfaction with some disk drives. Accordingly, there is a need for disk drives and methods that can operate more quietly.

SUMMARY OF THE DISCLOSURE

Examples of the present invention relate to reduction in acoustic noise by tuning seek characteristics of a servo controller, depending on a radial position of a head relative to a disk. The servo controller can provide compensation for acoustic resonance modes.

According to one exemplary embodiment, a servo controller is provided having a circuit that provides different seek characteristics depending on a present position of a first head along a radius of a disk.

A further example embodiment of the present invention provides a method for controlling an actuator to cause movement of the head to a new location, the movement characteristics determined on a present position of the head along a radius of the disk to avoid excitation to a resonance frequency Another example embodiment provides a method. The method includes measuring seek acoustic characteristics to determine a resonance mode dependent on a radial position of the head relative to a disk. Values dependent on the radial position of the head relative to the disk are determined to avoid excitation to the resonance mode at the radial position of the head relative to the disk.

DETAILED DESCRIPTION OF PREFERRED EMBODIMENTS

Embodiments of the present invention are directed to reducing acoustic noise from operation of internal components of disk drives. Disk drives include one or more disks for storing data, an actuator, one or more heads, and a servo controller. Each head is operable to read data from and to write data to one or more tracks on a surface of a corresponding disk. The tracks are typically concentric circular tracks, but a disk may have a spiral track, such as is common for compact discs (CDs). The heads are connected to the actuator, and when a head performs a read or a write operation on a disk, the actuator is moved as part of a seek operation so that the head is positioned over a destination track. The movement of the actuator during a seek operation is controlled by the servo controller based in part on a seek profile that specifies how the actuator is to be moved during the seek operation.

Seek noise is caused at least in part by the dissipation of energy applied to the actuator to move the heads over the correct track, and by vibrations and resonances that occur in the drive as the actuator moves. Noise can become more substantial if a resonant frequency is obtained, resulting in additional vibration in the disk drive due to vibration at a fundamental harmonic frequency of the disk drive.

Figure 1:
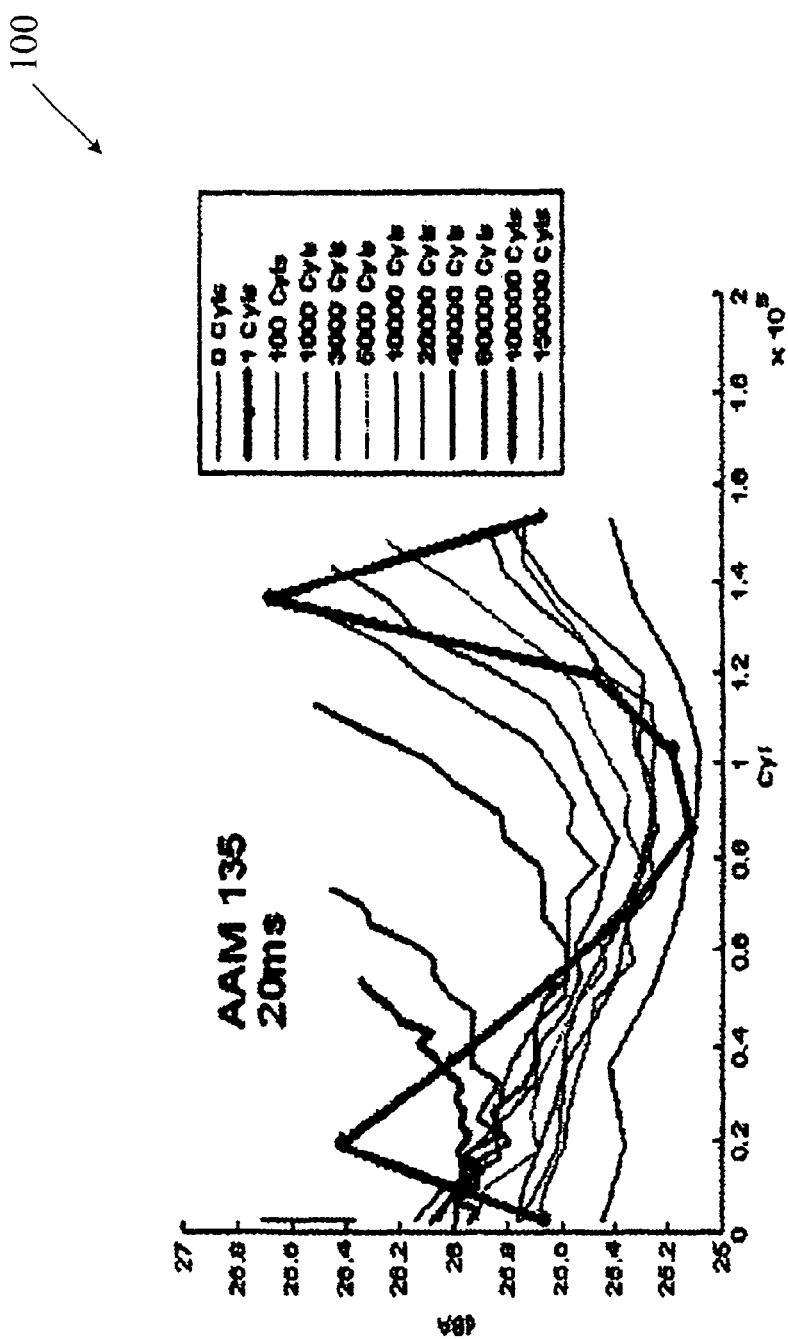
FIG. 1 is a graph that shows an example of ping-pong seek sound power at different seek lengths and at different locations, including dBA v. ping track location for various seek lengths.

Typically, a fixed position mode table is used to handle all seeks with the same seek distance, regardless of the position of the actuator or head. As shown by the graph 100 in FIG. 1, by the use of a fixed position mode table, changes in the resonance mode when the head is at some cylinder locations are not accounted for. FIG. 1 illustrates ping-pong seek sound power at different seek lengths and at different locations. The X axis is the cylinder number and the Y axis is the sound power in dBA. Notably, the 1 track seek (illustrated by the thickest line) shows significant performance degradation when close to the inside diameter and when close to the outside diameter.

Figure 2:
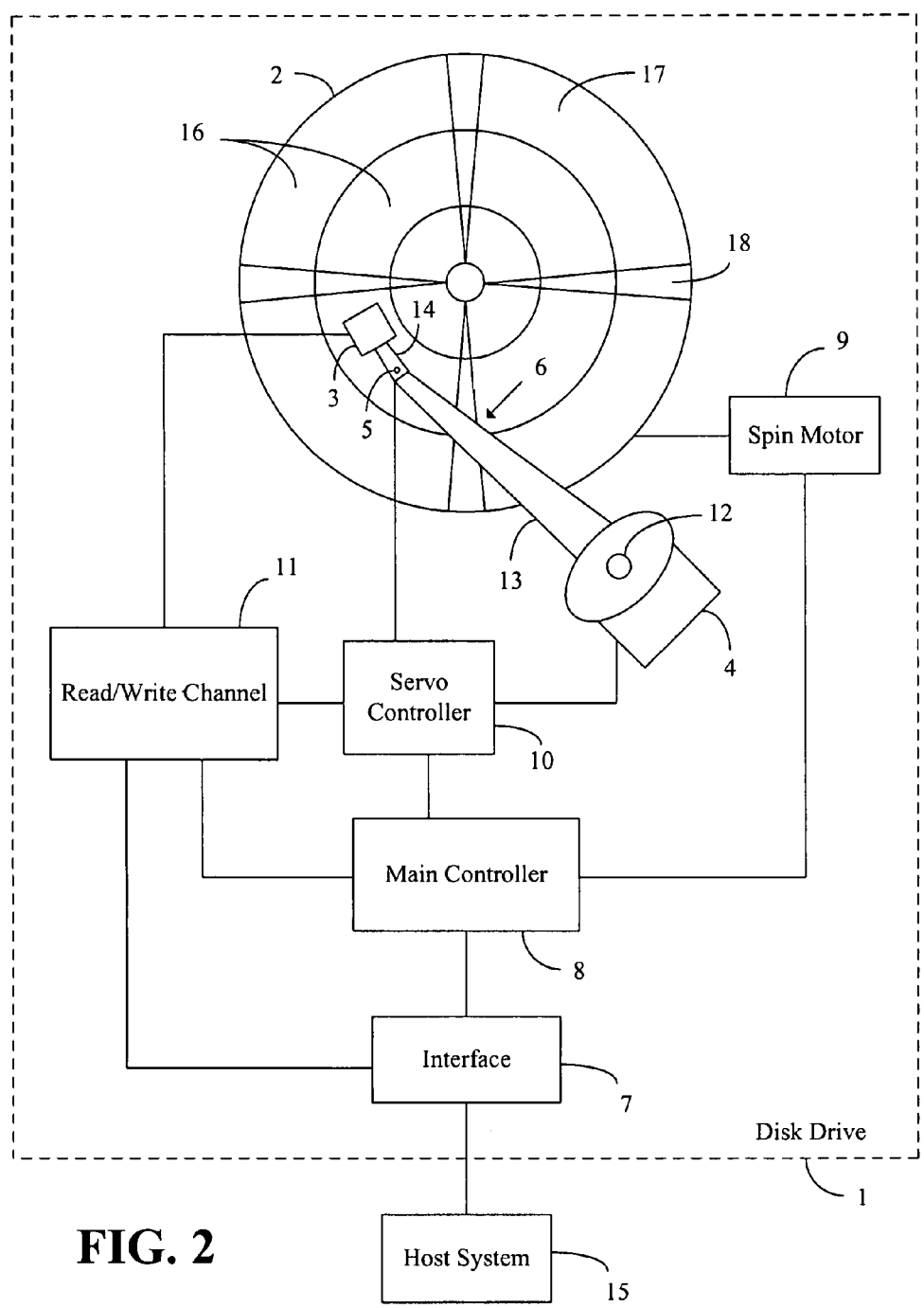
FIG. 2 illustrates a functional block diagram of a disk drive of an embodiment of the present invention.
Figure 3:
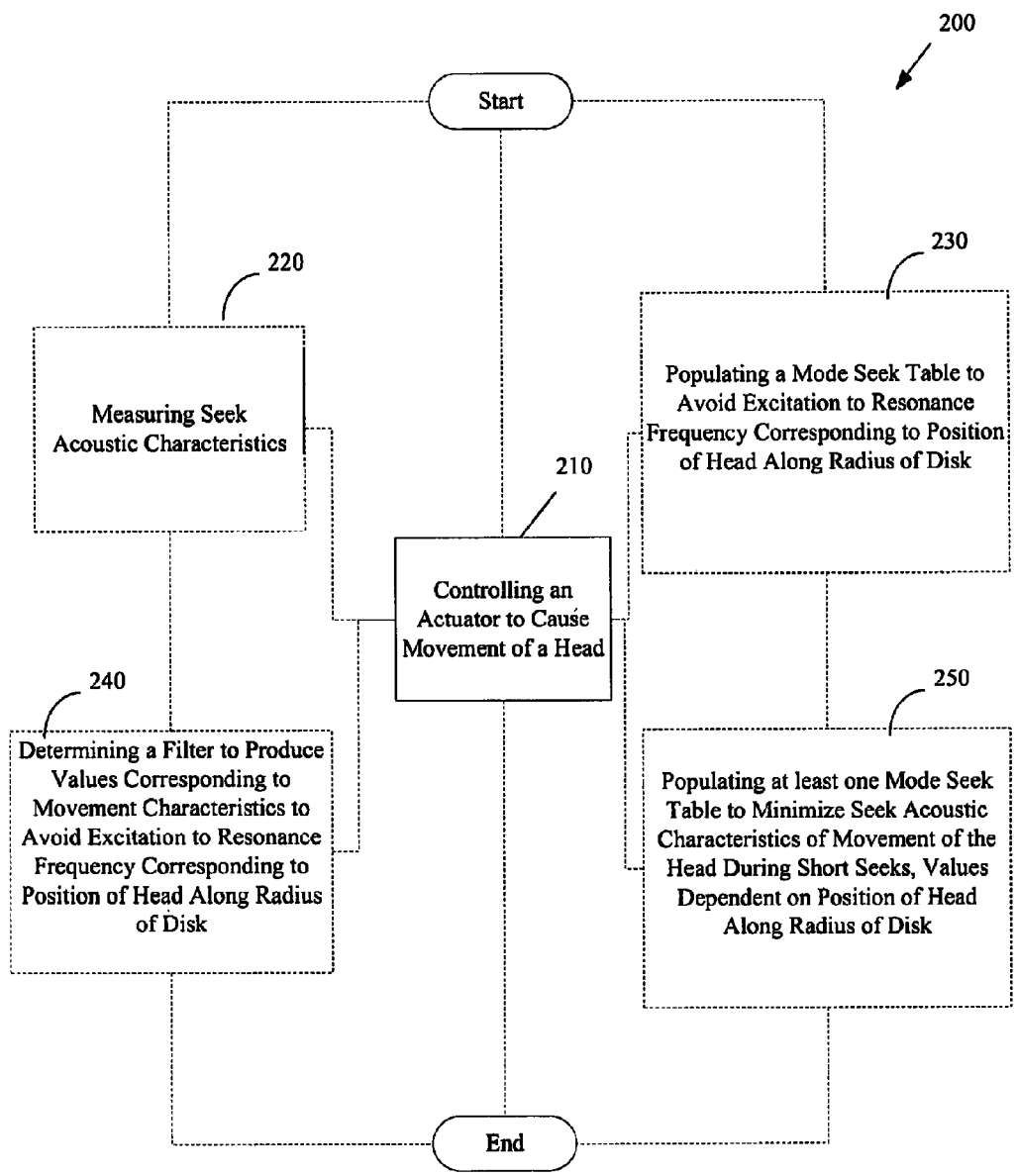
FIG. 3 illustrates a method according to an embodiment of the present invention.
Figure 4:
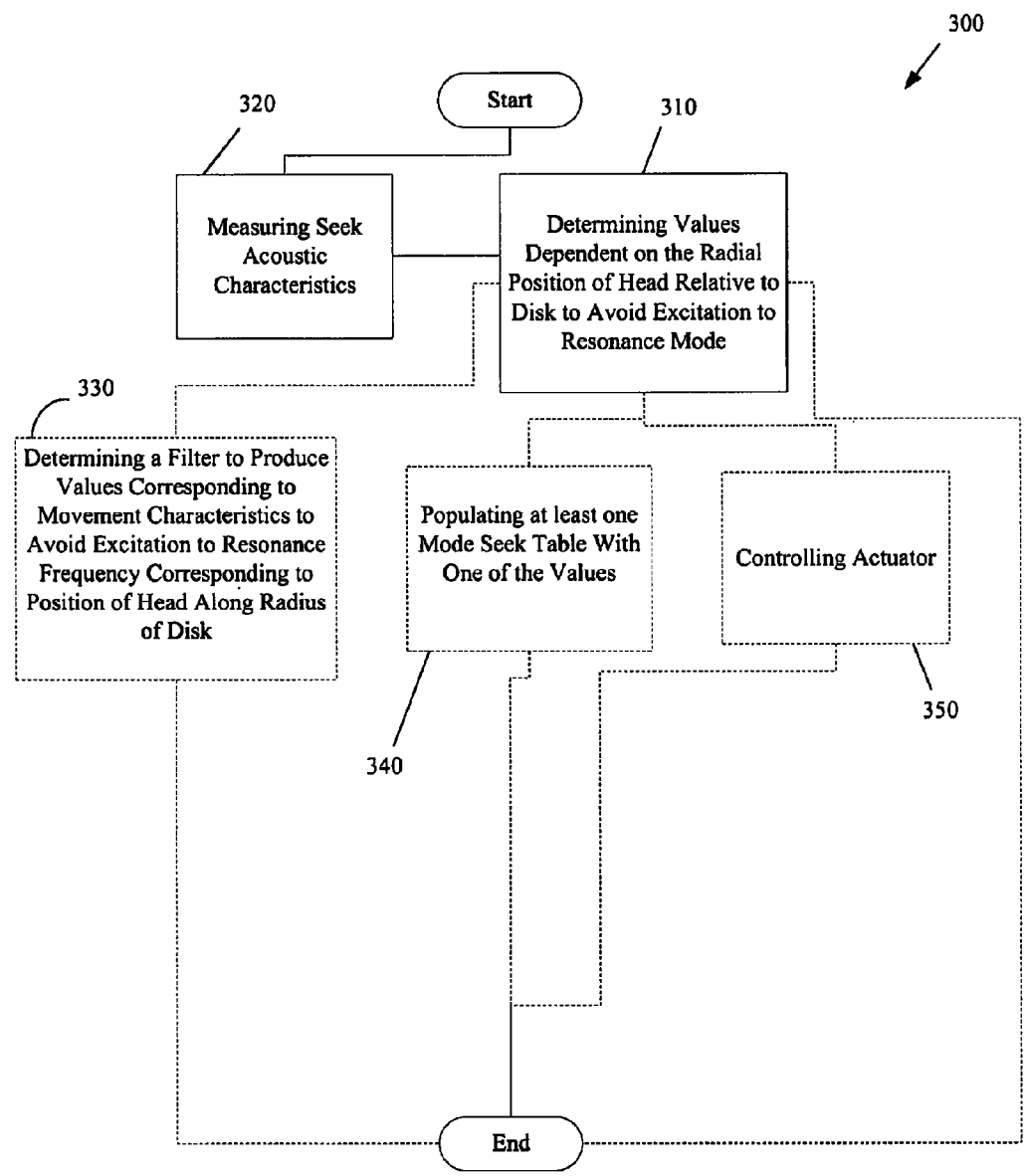
FIG. 4 illustrates a method according to another embodiment of the present invention.

Embodiments of the present invention recognize that the excitations to the drive actuator typically do not remain constant as the actuator moves the head along a radius of the disk. FIG. 2 illustrates a functional block diagram of a disk drive 1 of an example embodiment of the present invention. The disk drive 1 comprises a disk 2, a transducer or head 3, a coarse actuator 4, a microactuator 5, an actuator arm assembly 6, an interface 7, a main controller 8, a spin motor 9, a servo controller 10, and a read/write (r/w) channel 11. The head 3 is mounted on one end of the actuator arm assembly 6, and another end of the actuator arm assembly 6 is connected to a base (not shown) of the disk drive 1 by a bearing 12.

While embodiments of the invention may use only a single actuator and single member arm, for purposes of illustration, the exemplary embodiment of FIG. 2 is shown with the actuator arm assembly 6 having a first member 13 and a second member 14 that are interconnected by the microactuator 5. During operation, the disk 2 spins around a central axis, and the head 3 reads data from or writes data to a surface of the disk 2. The coarse actuator 4 rotates the actuator arm assembly 6 about the bearing 12 in order to control a position of the microactuator 5 and the head 3 over the disk 2. The microactuator 5 moves the second member 14 of the actuator arm assembly 6 to position the head 3 over the disk 2.

The coarse actuator 4 may comprise a motor, such as a voice coil motor and the like, and may provide for coarse positioning of the head 3 over the disk 2. The microactuator 5 may comprise, for example, a piezoelectric actuator, an electromagnetic actuator, an electrostatic actuator, and the like. The microactuator 5 may provide for fine positioning of the head 3 over the disk 2. A range of movement of the microactuator 5 may be small, such as moving the head 3 across a few tracks, while a range of movement of the coarse actuator 4 may be large, such as moving the head 3 across all tracks on the disk 2.

The disk drive 1 is not limited to having only a single disk 2, but may have a plurality of disks. Also, data may be written to both a top surface and a bottom surface of each disk, in which case a different head is required for each surface. The head 3 may have a single element for performing both reading and writing, or the head 3 may have separate elements for performing each of those operations, in which case the head 3 would comprise a read element and a write element.

In the following discussion, the disk drive 1 is described with reference to functional blocks and not discrete hardware elements. The functions may be implemented using one or more of hardware, software, and firmware. In addition, more than one function, or different parts of functions, may be combined in a given hardware, software, or firmware implementation.

When the disk drive 1 is connected to a host system 15, the interface 7 communicates with the host system 15 to receive, for example, data and commands, and to send, for example, data and status identifiers. The interface 7 also communicates with the main controller 8 and the r/w channel 11 to send and receive, for example, data and commands. When the main controller 8 receives a command from the interface 7 for a read or a write operation, the main controller 8 provides a signal to the spin motor 9 to cause the disk 2 to spin.

As shown in FIG. 2, the disk 2 has a plurality of tracks 16 for storing data. Each of the tracks 16 has a plurality of data sectors 17 and a plurality of embedded servo sectors 18. During operation of the disk drive 1, a data block may be read from or written to a data sector of the plurality of data sectors 17. The plurality of embedded servo sectors 18 are written with servo patterns or data that are used for determining a position of the head 3 with respect to a track of the plurality of tracks 16.

When performing a read or a write operation, the main controller 8 sends a signal that contains information about a selected track to the servo controller 10. The servo controller 10 then performs a seek operation to position the head 3 over the selected track. The seek operation may be a short seek operation, in which the head 3 is moved across a small number of tracks, or a long seek operation, in which the head 3 is moved across a large number of tracks.

During a seek operation, the head 3 reads data from servo sectors of the plurality of servo sectors 18 on the disk 2, and the head 3 provides a signal based on the read data to the r/w channel 11. The r/w channel 11 processes the signal from the head 3 when the head 3 reads data from the servo sectors, and the r/w channel 11 provides servo information to the servo controller 10 by processing the signal from the head 3. The servo controller 10 uses the servo information as a sensed position signal that indicates a position of the head 3 with respect to a track of the plurality of tracks 16. A sensed position signal may be used as feedback. Thus, a position error signal may indicate a difference between a desired reference position of the head 3 specified by the reference signal and an actual position of the head 3 specified by the sensed position signal.

Ideally, the head 3 is positioned directly over a center of the selected track during the seek operation. However, when the head 3 is positioned over the selected track, there may be some amount of seek settle track-misregistration (TMR), which represents a misalignment of the head 3 from the center of the selected track during seek settle when the head 3 is settling over the selected track. The seek settle TMR may be due to, for example, the head 3 overshooting the center of the selected track and having to be repositioned toward the center of the selected track. The head 3 may have particular tolerances to perform operations even when there is some TMR, so the servo controller 10 may wait for the head 3 to settle over the selected track, and may declare that the head 3 is on-track once the TMR is within a tolerance of the head 3 for an operation.

When the servo controller 10 determines that the head 3 is on-track, the servo controller 10 sends a signal to the r/w channel 11 to allow for the start of a read or a write operation. It is also possible that the servo controller 10 sends the signal to the main controller 8 rather than to the r/w channel 11, in which case the main controller 8 would then send the signal to the r/w channel 11. The r/w channel 11 also receives a command from the main controller 8 that specifies the type of operation to be performed. In the case of a read operation, the r/w channel 11 causes the head 3 to read the data and then sends the data to either the interface 7 or the main controller 8. In the case of a write operation, the r/w channel 11 receives data from either the interface 7 or the main controller 8 and causes the head 3 to write the data.

The specifics of movement of the actuator and head are determined by a seek profile. Typically, a seek profile would be determined by the length of the seek, regardless of where on the disk the head was located. However, embodiments of the present invention relate to disk drives and methods that allow for a reduction in acoustic noise from a disk drive by tuning the seek characteristics of a disk drive. According to one exemplary embodiment, a servo controller controls the actuator, providing different seek characteristics depending on a present position of the first head along a radius of the first disk.

In the example embodiment, the seek characteristics are tuned to address actuator response variations, which could be due to, for example, resonance mode variations or the excitation variations across the stroke. Optionally, the servo controller can provide different seek characteristics based on one or more variable position mode seek tables. In the case of multiple tables, a position mode seek table can be selected according to a cylinder range where a short seek is requested. Short seeks can be, for example, 1 track, 5 tracks, 10 tracks or 100 tracks. In the example embodiment, each position mode seek table is tuned to avoid excitation to a resonance mode for a corresponding cylinder range. In one example, the cylinders are grouped into three ranges, resulting in three tables. In one case, a table is directed for the cylinder range near the inside diameter of the disk and another table is directed for the cylinder range near the outside diameter of the disk. Optionally, the servo controller may have a memory for storing one or more position mode seek tables.

While the invention is not limited to a particular table format, non-limiting examples of the invention can use one or more seek tables that can be indexed based on a current position of a head with respect to a radius of a disk. Such a position may be defined by the use of a track identifier, or other method of determining the position of the head relative to an inside diameter and/or an outside diameter of the disk. The remainder of the seek table can, in the present example, use parameters typically found in a seek table, including length of the seek. According this example of the invention, the seek profile is configured in relation to where the head is located relative to the disk so as to minimize resonance mode and excitation variations, as determined by previous measurement.

The use of values tuned to avoid excitation to a resonance mode for a corresponding cylinder range may be used for short seeks only, and/or may be used for long seeks. Embodiments of the invention may also be used with a plurality of disks, including examples in which each disk has a corresponding head or two heads, one head flying on each surface of the disk. In such a configuration, the servo controller provides the different seek characteristics based on whether the first head or the second head is being read and a corresponding cylinder range. The different seek characteristics are tuned to avoid excitation to a resonance mode for the disk drive. The servo controller can select a position mode seek table of the plurality of position mode seek tables, according to the corresponding head and cylinder range where a short seek is requested.

In the event that different seek tables results in different seek table lengths, resulting in seek time differences, different track skews can be used when crossing those cylinder range boundaries. Embodiments of the invention can also be used in non-table applications by tuning respective parameters differently depending on the cylinder ranges. Embodiments of the invention can be limited to short seeks, or may be used on any type of seek.

A further example embodiment of the present invention provides a method 200 for providing control 210 in a disk drive. According to this embodiment, the method 200 can include spinning the disk and controlling the actuator to cause movement of the head to a new location. In the example method, the movement characteristics are determined on a present position of the head along a radius of the disk to avoid excitation to a resonance frequency.

Number of sets and boundaries of cylinder range can be decided by examining mechanical Bode plots in different radii or doing seek acoustic measurement. Seek acoustic characteristics may be measured 220 to determine the resonance frequency corresponding to each of a plurality of positions of the head along the radius of the disk.

A mode seek table may be populated 230 with values corresponding to the movement characteristics to avoid the excitation to the resonance frequency corresponding to each of a plurality of positions of the head along the radius of the disk. Initial values for the variable position mode seek table(s) may be set, for example, during a design, manufacturing and/or calibration process by measuring acoustic performance of the disk drive According to the example method, a filter may optionally be determined 240 to produce values corresponding to the movement characteristics to avoid the excitation to the resonance frequency corresponding to a corresponding position of the head along the radius of the disk.

At least one mode seek table may be populated 250 with values to minimize the seek acoustic characteristics of movement of the head during short seeks, the values dependent on the position of the head along the radius of the disk. Optionally, the actuator may provide the movement characteristics based on a plurality of position mode seek tables. In such a case, a position mode seek table may be selected according to a cylinder range where a short seek is requested.

Another example embodiment provides a method 300 for calibrating a disk drive. According to this embodiment, the method can include spinning the disk and measuring 310 seek acoustic characteristics to determine a resonance mode dependent on a radial position of the head relative to the disk. Values dependent on the radial position of the head relative to the disk are determined 320 to avoid excitation to the resonance mode at the radial position of the head relative to the disk.

Optionally, according to this method a filter may be determined 330 to produce the values on the radial position of the head relative to the disk, to avoid the excitation to the resonance frequency corresponding to the radial position of the head relative to the disk. Also optionally, at least one seek mode table may be populated 340 with a plurality of the values.

Also, optionally according to this method, the actuator may be controlled 350 to cause movement of the head during a short seek, using the values corresponding to the radial position of the head relative to the disk.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. The scope of the invention is indicated by the attached claims, rather than the embodiments. Various modifications and changes that come within the meaning and range of equivalency of the claims are intended to be within the scope of the invention.

What is claimed is:

1. A device comprising:
   a first head; and
   a servo controller that provides different seek characteristics, each seek characteristic based on determination of a resonance mode dependent on a position of the first head, wherein the resonance mode is determined based on acoustic characteristics corresponding to the position of the first head.

2. The device of claim 1, wherein the servo controller provides the different seek characteristics for seeks of less than five tracks.

3. The device of claim 1, wherein the different seek characteristics provided by the servo controller are tuned to address resonance mode variations of a disk drive.

4. The device of claim 1, wherein the different seek characteristics provided by the servo controller are tuned to address excitation variations.

5. The device of claim 1, wherein the servo controller provides the different seek characteristics based on a plurality of position mode seek tables, each position mode seek table tuned to avoid excitation to a resonance mode for a corresponding cylinder range.

6. The device of claim 1, wherein the position of the first head is along a radius of a disk.

7. The device of claim 1, wherein the position of the first head is a position prior to moving the first head to a new location during a seek operation.

8. A disk drive, comprising:
a device as recited in claim 1;
a first disk having a surface provided with a plurality of tracks for storing data; and
a first actuator for positioning the first head relative to the first disk.

9. The disk drive of claim 8, further comprising:
a second actuator mounted on an arm movable by the first actuator, the second actuator being a microactuator and configured to position the first head relative to the first disk; and
wherein the servo controller is configured to control the microactuator in accordance with the different seek characteristics.

10. The disk drive of claim 8, further comprising:
a second disk having a surface provided with a plurality of tracks for storing data; and
a second head for reading data from the second disk; and
wherein the servo controller provides the different seek characteristics based on whether the first head or the second head is being read and a corresponding cylinder range, the different seek characteristics tuned to avoid excitation to a resonance mode for the disk drive.

11. The disk drive of claim 10, wherein the servo controller provides the different seek characteristics for seeks of less than five tracks.

12. The disk drive of claim 10, wherein the servo controller selects a position mode seek table of a plurality of position mode seek tables according to the corresponding head and cylinder range where a short seek is requested.

13. A method, comprising:
measuring acoustic characteristics to determine a resonance frequency corresponding to each of a plurality of positions of a head along a radius of a disk; and
controlling an actuator to cause movement of head to a new position, wherein seek characteristics controlling the movement are dependent upon the previously determined resonance frequency corresponding to the new position of the head.

14. The method of claim 13, wherein the act of controlling is performed after the act of measuring.

15. The method of claim 13, further comprising, after the act of measuring, populating a mode seek table with values corresponding to the seek characteristics to avoid excitation to the resonance frequency corresponding to each of the plurality of positions of the head along the radius of the disk.

16. The method of claim 13, further comprising, after the act of measuring, determining a filter to produce values corresponding to the seek characteristics to avoid excitation to the resonance frequency corresponding to each of the plurality of positions of the head along the radius of the disk.

17. The method of claim 13, further comprising, populating at least one mode seek table with values to minimize the seek acoustic characteristics of movement of the head during short seeks, the values dependent on the position of the head along the radius of the disk.

18. The method of claim 13, wherein the actuator provides the seek characteristics based on a plurality of position mode seek tables, a position mode seek table selected according to a cylinder range where a short seek is requested.

19. The method of claim 13, wherein the position of the head is along a radius of a disk.

20. A method, comprising:
measuring seek acoustic characteristics to determine a resonance mode dependent on a radial position of a head relative to a disk; and
determining seek characteristics dependent on the radial position of the head relative to the disk to avoid excitation to the resonance mode at the radial position of the head relative to the disk.

21. The method of claim 20, further comprising determining a filter to produce the seek characteristics dependent on the radial position of the head relative to the disk to avoid the excitation to the resonance frequency corresponding to the radial position of the head relative to the disk.

22. The method of claim 20, further comprising populating at least one seek mode table with a plurality of the seek characteristics.

23. The method of claim 20, further comprising controlling an actuator to cause movement of the head using the seek characteristics corresponding to the radial position of the head relative to the disk.

24. A disk drive, comprising:
the device of claim 1, wherein the servo controller provides the different seek characteristics based on whether the first head or a second head is being read.

25. A disk drive, comprising:
the device of claim 1, wherein the servo controller provides the different seek characteristics based on a corresponding cylinder range.

* * * * *